(12) United States Patent
Hirotsu et al.

(10) Patent No.: US 9,146,567 B2
(45) Date of Patent: Sep. 29, 2015

(54) CURRENT CONTROL DEVICE

(75) Inventors: Teppei Hirotsu, Hitachi (JP); Nobuyasu Kanekawa, Hitachi (JP); Ryosuke Ishida, Kiryu (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 219 days.

(21) Appl. No.: 13/985,627

(22) PCT Filed: Feb. 21, 2012

(86) PCT No.: PCT/JP2012/054161
§ 371 (c)(1),
(2), (4) Date: Aug. 15, 2013

(87) PCT Pub. No.: WO2012/121007
PCT Pub. Date: Sep. 13, 2012

(65) Prior Publication Data
US 2013/0320948 A1    Dec. 5, 2013

(30) Foreign Application Priority Data
Mar. 8, 2011    (JP) .................................. 2011-049823

(51) Int. Cl.
*H02M 3/157* (2006.01)
*G05F 1/10* (2006.01)
*H02P 29/02* (2006.01)
*H02M 7/538* (2007.01)
*H01F 7/18* (2006.01)
*H02M 1/32* (2007.01)

(52) U.S. Cl.
CPC ............. *G05F 1/10* (2013.01); *H02M 7/53803* (2013.01); *H02P 29/021* (2013.01); *H02P 29/022* (2013.01); *H02P 29/023* (2013.01); *H01F 2007/1888* (2013.01); *H02M 1/32* (2013.01)

(58) Field of Classification Search
CPC ............ H02M 3/157; H02M 2001/32; H02M 3/1588; H02P 29/02
USPC .................. 323/271, 282, 284, 285, 222, 225
See application file for complete search history.

(56) References Cited

U.S. PATENT DOCUMENTS

| | | | | |
|---|---|---|---|---|
| 7,825,642 | B1* | 11/2010 | Young et al. | 323/224 |
| 2005/0093505 | A1 | 5/2005 | Kameya | |
| 2013/0082675 | A1* | 4/2013 | Capodivacca et al. | 323/283 |
| 2013/0147449 | A1* | 6/2013 | Lawson et al. | 323/282 |

FOREIGN PATENT DOCUMENTS

| | | |
|---|---|---|
| JP | 3-213464 A | 9/1991 |
| JP | 8-205388 A | 8/1996 |

(Continued)

OTHER PUBLICATIONS

International Search Report dated May 22, 2012 with English translation (5 pages).

*Primary Examiner* — Matthew Nguyen
*Assistant Examiner* — Kyle J Moody
(74) *Attorney, Agent, or Firm* — Crowell & Moring LLP (57) ABSTRACT

A current control device capable of performing widely applicable failure detection without a motor rotation speed sensor is provided. A current control semiconductor element includes, on a same semiconductor chip, a transistor that drives load, a current detection circuit that detects current of the load, a compensator that calculates an on-duty of the transistor from a current command value and a current value output from the current detection circuit, and a PWM timer that generates a pulse turning on the transistor on the basis of the on-duty. A microcontroller sends the current command value to the current control semiconductor element, receives the current value output from the current detection circuit and the on-duty output from the compensator from the current control semiconductor element, and detects failure of the current control semiconductor element on the basis of the received current value and on-duty.

5 Claims, 9 Drawing Sheets

(56) References Cited

FOREIGN PATENT DOCUMENTS

| | | | |
|---|---|---|---|
| JP | 2005-143153 A | 6/2005 |
| JP | 2008-199851 A | 8/2008 |
| JP | 2008-306838 A | 12/2008 |

\* cited by examiner

CURRENT CONTROL DEVICE

TECHNICAL FIELD

The present invention relates to a current control device, and particularly relates to a current control device suitable for failure diagnosis of a current detection circuit.

BACKGROUND ART

There has been widely used an electric actuator such as a motor and a solenoid in order to convert an electrical signal into mechanical movement or hydraulic pressure with the increase in electronic control of various controlled objects. On the other hand, when an electric actuator is used for control that involves human life such as control in a motor vehicle, the electric actuator is required to have high reliability.

In order to improve reliability of an electric actuator, it is necessary to reliably detect failure of a current control device which is used in the electric actuator, and then, depending on the type of the detected failure, perform a fail-stop function for stopping the failed current control device so as to prevent an unsafe state of a host system, or a fail-operative function for continuing current control while avoiding the use of a failure part when the current control is possible.

As a current control device that detects failure of a current detection circuit whose failure is difficult to be detected, there is known one that detects failure of a current detection circuit by using the output of a motor rotation speed sensor in addition to the output of the current detection circuit (see PTL 1, for example).

CITATION LIST

Patent Literature

PTL 1: Japanese Patent Application Laid-Open No. 03-213464

SUMMARY OF INVENTION

Technical Problem

In recent years, downsizing and price reduction of a current control device have been achieved by means of control that is performed by estimating a motor rotation speed and does not therefore require a motor rotation speed sensor (sensorless control). Further, a solenoid control device is not provided with a motor rotation speed sensor.

Therefore, there is a problem in that failure of a current detection circuit cannot be detected by a current control device of the type that requires a motor rotation speed sensor as in PLT 1.

Further, in recent years, a current control device is implemented using a current control semiconductor element which has, on the same semiconductor element, a transistor which drives load, a current detection circuit which detects current of the load, and a compensator which calculates an on-duty of the transistor from a current command value and a current value output from the current detection circuit, and a microcontroller which sends the current command value to the current control semiconductor element to thereby achieve downsizing and price reduction of the current control device.

It is therefore an object of the present invention to provide a current control device that is implemented in the above manner and capable of performing widely applicable failure detection without a motor rotation speed sensor.

Solution to Problem (1) To achieve the object, the present invention provides a current control device including: a current control semiconductor element including, on a same semiconductor chip, a transistor for driving load, current detection circuit for detecting current of the load, a compensator for calculating an on-duty of the transistor from a current command value and a current value output from the current detection circuit, and a PWM timer for generating a pulse turning on the transistor on the basis of the on-duty; and a microcontroller for sending the current command value to the current control semiconductor element, wherein the microcontroller receives a current value output from the current detection circuit and an on-duty output from the compensator from the current control semiconductor element, and detects failure of the current control semiconductor element on the basis of the current value and the on-duty both received from the current control semiconductor element.

This configuration makes it possible to perform widely applicable failure detection.

(2) In (1) above, it is preferable that the microcontroller detects failure of the current control semiconductor element when the current value received from the current control semiconductor element does not agree with a current command value, or when the on-duty received from the current control semiconductor element does not agree with an expected value of the on-duty.

(3) In (2) above, it is preferable that the microcontroller sends zero as an on-duty command value to the current control semiconductor element after detecting failure of the current control semiconductor element, and the current control semiconductor element performs off control of the transistor in accordance with the on-duty command value received from the microcontroller.

(4) In (3) above, it is preferable that the current control semiconductor element includes a selector for selecting either an on-duty output from the compensator or the on-duty command value received from the microcontroller, and the selector selects the on-duty command value received from the microcontroller on the basis of information on a valid bit output from the microcontroller and performs off control of the transistor in accordance with the on-duty command value.

(5) In (3) above, it is preferable that the current control semiconductor element includes a zero detector for detecting that the on-duty command value received from the microcontroller is zero, and the zero detector causes output of the PWM timer to become zero to perform off control of the transistor.

(6) In (2) above, it is preferable that the microcontroller sends an on-duty command value to the current control semiconductor element after detecting failure of the current control semiconductor element, and the current control semiconductor element performs on and off control of the transistor in accordance with the on-duty command value received from the microcontroller.

(7) In (6) above, it is preferable that the current control semiconductor element includes a selector for selecting either an on-duty output from the compensator or the on-duty command value received from the microcontroller, and the selector selects the on-duty command value received from the microcontroller on the basis of information on a valid bit output from the microcontroller and performs on and off control of the transistor in accordance with the on-duty command value.

(8) In (6) above, it is preferable that the current control semiconductor element includes, in addition to the PWM timer for generating a pulse turning on the transistor on the basis of an on-duty output from the compensator, a second PWM timer for generating a pulse turning on the transistor on the basis of the on-duty command value received from the microcontroller, and a selector for selecting either a pulse output from the PWM timer or a pulse output from the second PWM timer, and the selector selects the pulse output from the second PWM timer on the basis of information on a valid bit output from the microcontroller and performs on and off control of the transistor in accordance with the pulse.

Advantageous Effects of Invention

According to the present invention, it is possible to provide a current control device that is implemented in the above manner and capable of performing widely applicable failure detection without a motor rotation speed sensor.

DESCRIPTION OF EMBODIMENTS

Hereinafter, the configuration and the operation of a current control device according to a first embodiment of the present invention will be described with reference to FIGS. 1 to 4.

First, the configuration of a solenoid control system using the current control device according to the present embodiment will be described with reference to FIG. 1.

Figure 1:
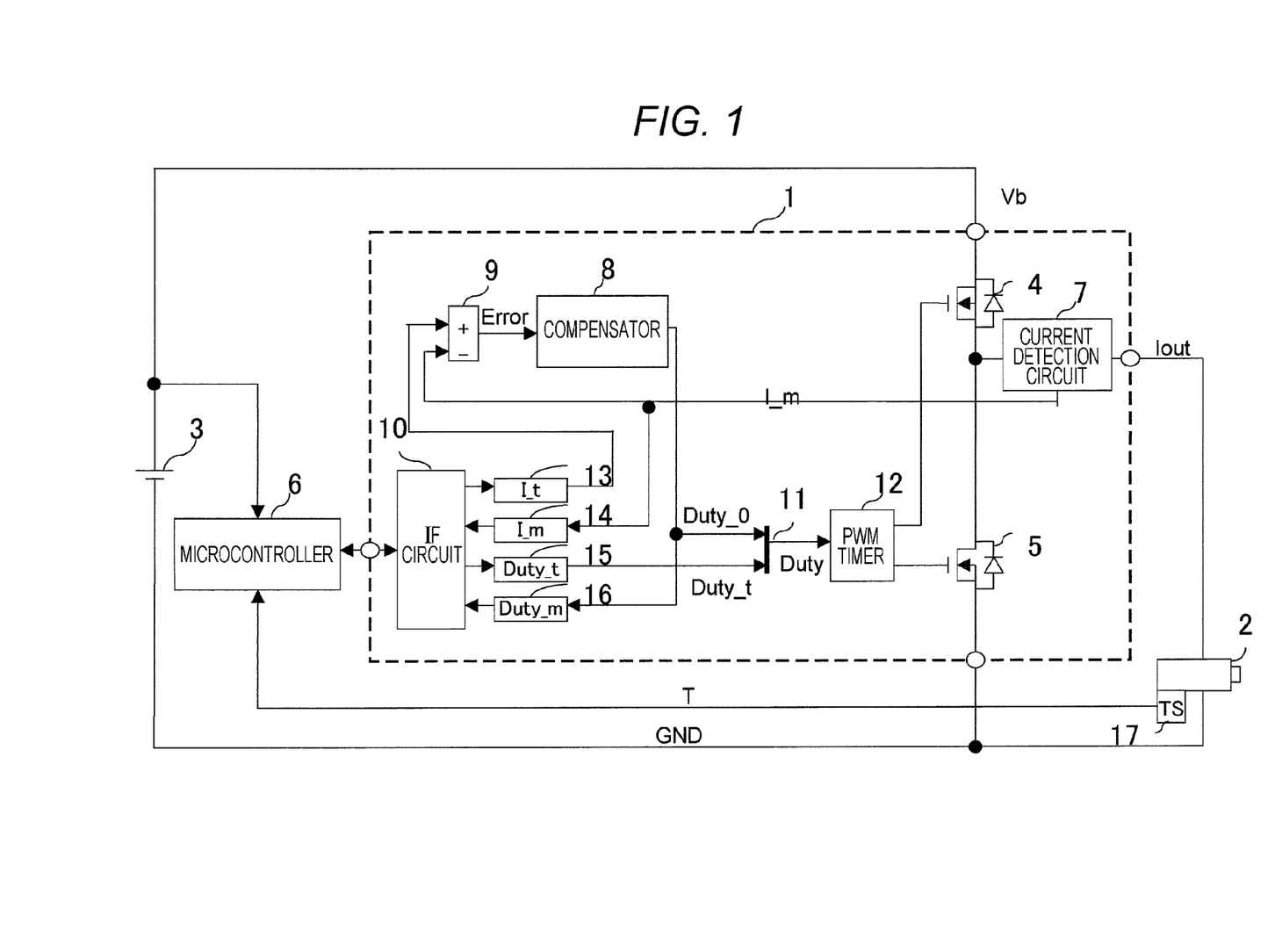
FIG. 1 is a block diagram illustrating the configuration of a solenoid control system using a current control device according to a first embodiment of the present invention.

FIG. 1 is a block diagram illustrating the configuration of the solenoid control system using the current control device according to the first embodiment of the present invention.

The current control device of the present embodiment includes a current control semiconductor element 1 and a microcontroller 6.

The microcontroller 6 inputs voltage of a battery 3, temperature of a solenoid 2 detected by a solenoid temperature sensor 17, and values from other various sensors which are not shown, calculates a current command value for the solenoid 2 from these values, and sends the calculated value to the current control semiconductor element 1 via an interface circuit 10. The current control semiconductor element 1 controls current to be delivered from the battery 3 to the solenoid 2 on the basis of the current command value sent from the microcontroller 6. The current control semiconductor element 1 is connected to the solenoid 2 and the battery 3 which supplies voltage to the solenoid 2, and turns on and off voltage to be applied to the solenoid 2 by pulse width modulation (PWM) to thereby drive current flowing into the solenoid 2.

The microcontroller 6 reads out a current monitor value I_m and an on-duty monitor value Duty_m from the current control semiconductor element 1 via the interface circuit 10 to thereby detect failure of the current control semiconductor element 1. A method of the failure detection will be described later with reference to FIG. 3.

Further, when failure of the current control semiconductor element 1 is detected, the microcontroller 6 sends an on-duty command value Duty_t to the current control semiconductor element 1 via the interface circuit 10 to thereby achieve a fail-stop function or a fail-operative function. Details of this operation will be described later with reference to FIGS. 3 and 4.

The current control semiconductor element 1 is provided with a high-side MOSFET 4, a low-side MOSFET 5, a current detection circuit 7, a compensator 8, a difference calculator 9, the interface (IF) circuit 10, a selector 11, a PWM timer 12, a current command value register 13, a current monitor value register 14, an on-duty command value register 15, and an on-duty monitor value register 16.

The high-side MOSFET 4 is a switch between the solenoid 2 and the battery 3. The high-side MOSFET 4 is turned on when a gate signal thereof is at a high level, and turned off when the gate signal is at a low level. When the high-side MOSFET 4 is in an on state, current flowing in the solenoid 2 increases. On the other hand, when the high-side MOSFET 4 is in an off state, current flowing in the solenoid 2 decreases. Further, when the high-side MOSFET 4 is in an on state, the low-side MOFET 5 is in an off state.

The low-side MOFET 5 is used as a path through which current which has flowed into the solenoid 2 flows back when the high-side MOSFET 4 is in an off state. When the high-side MOSFET 4 is in an off state, the low-side MOFET 5 is in an on state.

The current detection circuit 7 outputs the current monitor value I_m which is an average value of current flowing in the solenoid 2. In this embodiment, the current detection circuit 7 is connected in series to the solenoid 2 and measures all current flowing in the solenoid 2. However, the current detection circuit 7 may be connected in parallel to the high-side MOSFET 4 or the low-side MOFET 5 and measure shunt current from the current flowing in the solenoid 2. The current monitor value I_m output from the current detection circuit 7 is input to the compensator 8 and the current monitor value register 14.

On the basis of a difference between a current command value I_t calculated by the difference calculator 9 and input from the current command value register 13 and the current monitor value I_m input from the current detection circuit 7, the compensator 8 calculates an optimal on-duty value Duty_0 for causing the current in the solenoid 2 to follow the current command value I_t. The calculated on-duty value Duty_0 is input to the selector 11 and the on-duty monitor value register 16.

The selector 11 selects either the on-duty value Duty_0 input from the compensator 8 or the on-duty command value Duty_t input from the on-duty command value register 15, and then outputs the selected value as a duty.

Now, for the purpose of explaining a selection method of the selector 11, a data format of the on-duty command value register 15 will be described with reference to FIG. 2.

Figure 2:
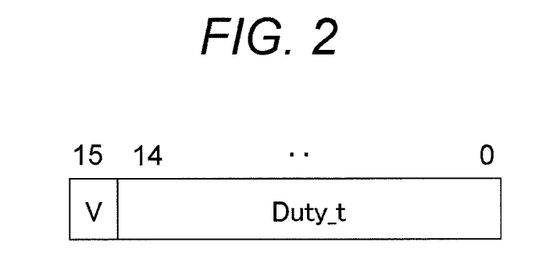
FIG. 2 is an explanatory diagram of a data format of an on-duty command value register used in the current control device according to the first embodiment of the present invention.

FIG. 2 is an explanatory diagram of the data format of the on-duty command value register used in the current control device according to the first embodiment of the present invention.

In this embodiment, the on-duty command value register 15 is a 16-bit register. Contents of respective fields of the duty command value register 15 are as follows.

bit 0 to 14: on-duty command value Duty_t
bit 15: valid bit V

When the valid bit V is one, the Duty_t is valid. On the other hand, when the valid bit V is zero, the Duty_t is invalid. Further, an initial value of the valid bit V is zero.

Further, any other number of bits than 16 can be selected for the on-duty command value register 15 depending on required accuracy.

The selector 11 shown in FIG. 1 selects the Duty_t when the valid bit V is one or selects the Duty_0 when the valid bit V is zero, and outputs the selected value as a duty.

The PWM timer 12 generates each of a pulse that turns on the high-side MOSFET 4 and a pulse that turns on the low-side MOFET 5 according to the Duty from the selector 11. Normally, the PWM timer 12 generates each of the pulse that turns on the high-side MOSFET 4 and the pulse that turns on the low-side MOFET 5 on the basis of the on-duty value Duty_0 from the compensator 8.

The IF circuit 10 provides an interface function for sending and receiving values retained in the current command value register 13, the current monitor value register 14, the on-duty command value register 15, and the on-duty monitor value register 16 between the microcontroller 6 and these registers via the IF circuit 10.

Next, the operation of the current control device according to the present embodiment will be described with reference to FIGS. 3 and 4.

Figure 3:
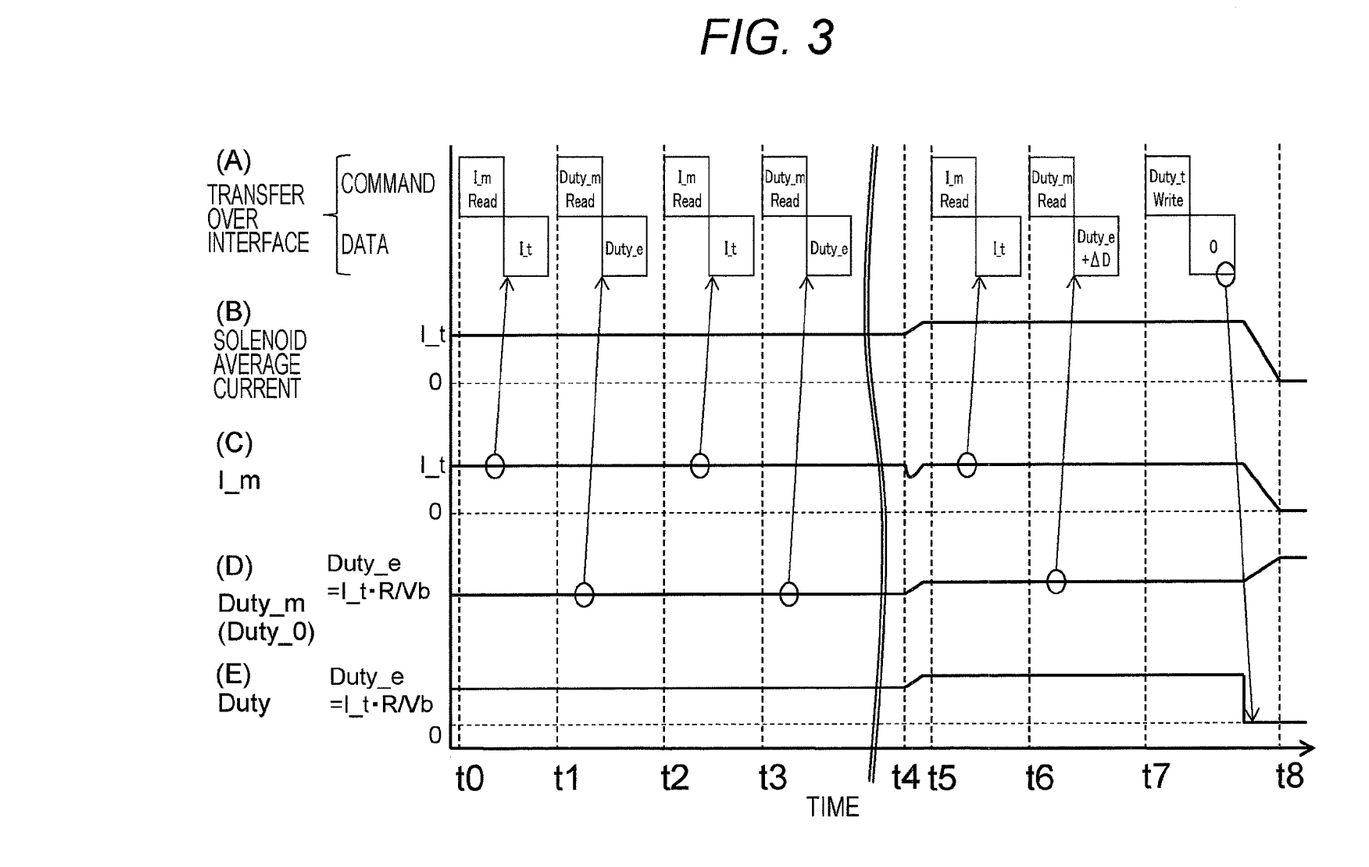
FIG. 3 is a timing chart illustrating the operation of a fail-stop function in the current control device according to the first embodiment of the present invention.

FIG. 3 is a timing chart illustrating the operation of a fail-stop function in the current control device according to the first embodiment of the present invention. FIG. 4 is a timing chart illustrating the operation of a fail-operative function in the current control device according to the first embodiment of the present invention.

First, the operation of the fail-stop function in the current control device according to the present embodiment will be described with reference to FIG. 3. In FIG. 3, a horizontal axis represents time. A vertical axis of (A) represents a command and data transferred over the interface circuit 10 to be fetched into the microcontroller 6 via the interface circuit 10. A vertical axis of (B) represents current flowing in the solenoid 2. A vertical axis of (C) represents the current monitor value I_m. A vertical axis of (D) represents the on-duty monitor value Duty_m. A vertical axis of (E) represents a duty value Duty. Further, the current control device is in normal operation at times t0 to t3, and in abnormal operation at a time t4 or later.

At the time t0, the microcontroller 6 outputs a read command of the current monitor value register 14 on the interface circuit 10 as shown in (A) in FIG. 3 to thereby read out a current monitor value I_m ((C) in FIG. 3) output from the current detection circuit 7 of the current control semiconductor element 1.

Then, at the time t1, the microcontroller 6 outputs a read command of the on-duty monitor value register 14 on the interface circuit 10 as shown in (A) in FIG. 3 to thereby read out an on-duty monitor value Duty_m ((D) in FIG. 3) output from the compensator 8 of the current control semiconductor element 1.

Then, the microcontroller 6 performs failure detection by comparing the read-out current monitor value I_m and the read-out on-duty monitor value Duty_m with respective expected values. In a steady state, an expected value of the current monitor value I_m is the current command value I_t, and an expected value Duty_e of the on duty monitor value Duty_m is calculated by the following formula (1).

$$Duty\_e = I\_t \cdot R / Vb \qquad (1)$$

In this formula, Vb denotes a voltage of the battery 3, and R denotes a resistance value of the solenoid 2. The resistance value R can be obtained by compensating the temperature characteristics in a solenoid resistance value at a normal temperature by a solenoid temperature input from the solenoid temperature sensor 17.

The current monitor value I_m read out at the time t0 and the on-duty monitor value Duty_m read out at the time t1 agree with the respective expected values. Therefore, it is determined that the current control semiconductor element 1 is in normal operation.

The failure detection is continuously performed also at the time t2 and the time t3 by comparing a current monitor value I_m and an on-duty monitor value Duty_m with respective expected values in the same manner as above. Although not shown in FIG. 3, the same failure detection is regularly performed thereafter.

When failure of the current detection circuit 7 in which the output thereof becomes lower than a normal output occurs at the time t4, the current monitor value I_m decreases. Accordingly, the compensator 8 increases the Duty_0 by ΔD in order to cause the current monitor value I_m to approach the current command value I_t, that is, to increase the lowered current monitor value I_m. As a result, although the current monitor value I_m comes to agree with the current command value I_t, an actual average value of current in the solenoid becomes larger than the current command value I_t. When the failure of the current detection circuit 7 in which the output thereof becomes lower than a normal output occurs in this manner, the compensator 8 performs feedback control so that the current monitor value I_m agrees with the current command value I_t. Therefore, a dangerous situation is caused by the gradually increased current by the compensator 8. In view of this, when such failure of the current detection circuit occurs, the operation of the current control device is stopped (a fail-stop function).

If failure of the current detection circuit 7 occurs at the time t4, a current monitor value I_m read out at the later time t5 agrees with an expected value thereof, and the failure cannot therefore be detected. However, since an on-duty monitor value Duty_m read out at the time t6 does not agree with an expected value thereof, the microcontroller 6 detects the failure of the current detection circuit 7.

Further, the microcontroller 6 performs determination of agreement/disagreement at a normal time where the current command value from the microcontroller 6 is maintained substantially constant. This is because of that, during a transition period where the current command value changes, "disagreement" determination is highly likely to be made constantly due to a difference between a command value and a measured value. Further, a determination criterion between agreement and disagreement should be previously determined such that "agreement" determination is made when a difference between the command value and the measured value is, for example, within ±1%, and "disagreement" determination is made when the difference between the command value and the measured value is, for example, larger than ±1%.

When failure of the current detection circuit occurs, a state of the current control device is uncertain, and safety of the system cannot therefore be ensured. Accordingly, it is necessary to stop the current control device. For doing this, at a time t7, the microcontroller 6 sends and writes contents including the valid bit V=1 and the on-duty command value Duty_t=0 as shown in the description of the date format of the on-duty command value register 15 to the on-duty command value register 15 as shown in (A) in FIG. 3. As a result, the output of the PWM timer 12 is fixed to zero at a time t8, and the current in the solenoid is thereby stopped.

As described above, it is possible to perform failure detection of the current control device without using a motor rotation speed sensor in the present embodiment.

Further, the present embodiment makes it possible to achieve the fail-stop function of the small and low-cost current control device which is implemented with the current control semiconductor element 1 and the microcontroller 6.

Next, the operation of a fail-operative function of the current control device of the present embodiment will be described with reference to FIG. 4. In FIG. 4, a horizontal axis represents time. Vertical axes of (A) to (E) in FIG. 4 are the same as those of (A) to (E) in FIG. 3. Further, the current control device is in normal operation at times t0 to t3, and in abnormal operation at a time t4 or later.

The same failure detection as described with reference to FIG. 3 is performed at the time t0 to the time t4, and it is determined that the current control semiconductor element 1 is in normal operation. Although not shown in FIG. 4, the same failure detection is regularly performed thereafter.

When failure of the current detection circuit 7 in which the output thereof becomes larger than a normal output occurs at the time t4, the current monitor value I_m increases. In this embodiment, such a situation occurs when the current detection circuit 7 is normal, but there is a problem in a feedback group which performs feedback control so that a detected current value agrees with a command value. In such a case, it is one possibility to stop the operation of the current control device. However, on the other hand, when the control is performed so as to reduce current, excessive current does not flow. Therefore, it is also possible to continue the operation of the current control device within a range in which a certain level of control can be performed. Accordingly, for example, when failure of a current detection circuit occurs while a vehicle is moving, control can be performed until the vehicle is pulled over on the shoulder of a road. For example, a case where a solenoid current control device is used as an actuator of an electric braking device, or a case where a motor current control device is used as an actuator of an electric power steering device falls under the above case. In view of this, when such failure of the current detection circuit occurs, the operation of the current control device is continued (a fail-operative function).

Figure 4:
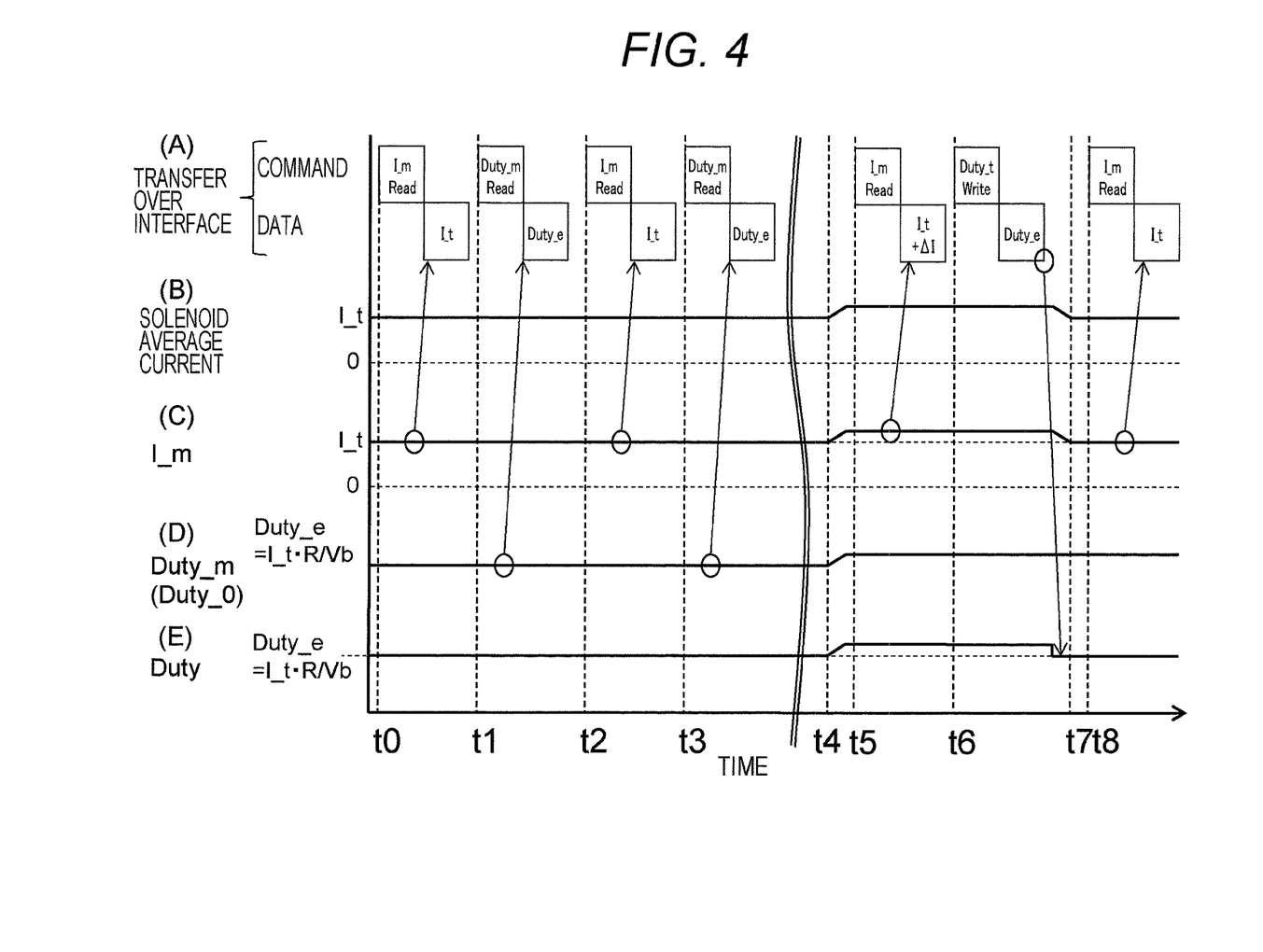
FIG. 4 is a timing chart illustrating the operation of a fail-operative function in the current control device according to the first embodiment of the present invention.

When failure of the compensator 8 in which the output thereof is stuck to a value larger than that of a normal output occurs at the time t4 in FIG. 4, the solenoid average current and the current monitor value I_m increase.

Further, a current monitor value I_m of the current detection circuit 7, the current monitor value I_m being read out at the time t5 after the occurrence of the above failure ((C) in FIG. 4) does not agree with an expected value thereof. As a result, the microcontroller 6 detects the failure. Since a failure location cannot be identified at this point, the operation may be continued.

Therefore, at the time t6, the microcontroller 6 writes contents of the fields of the on-duty command value register 15 including the valid bit V=1 and the on-duty command value Duty_t=Duty_e to the on-duty command value register 15 ((A) in FIG. 4). In this regard, the Duty_e is a positive value other than zero. As a result, the on-duty of the output pulse of the PWM timer 12 becomes Duty_e ((E) in FIG. 4), and, at the time t7, the solenoid current returns to I_t, namely, to a normal state ((C) in FIG. 4).

At the following time t8, the microcontroller 6 reads out a current monitor value I_m ((C) and (A) in FIG. 4), and compares the thus read-out current monitor value I_m with an expected value thereof. Then, the microcontroller 6 confirms that the current control device has actually returned to the normal state on the basis of the written contents in the on-duty command value register 15.

However, since a part of the current control device is in a failed state, a host system is informed of the occurrence of the failure in which the operation can be continued, and a display for urging prompt repair is provided.

As described above, the present invention makes it possible to achieve the fail-operative function of the small and low-cost current control device which is implemented with the current control semiconductor element 1 and the microcontroller 6.

As described above, since failure of the current control device is detected on the basis of the on-duty which is always calculated for controlling current and the current value output from the current detection circuit in the present embodiment, it is possible to achieve failure detection means of the current control device that is widely applicable and does not depend on the type of a sensor to be used.

Further, on behalf of the current control semiconductor element which does not have a failure diagnosis function, the microcontroller reads out the on-duty and the current value output from the current detection circuit from the current control semiconductor element to thereby perform failure diagnosis. Accordingly, it is possible to perform failure detection of the current control device which is implemented with the current control semiconductor element and the microcontroller.

Further, when failure of the current control semiconductor occurs, the microcontroller calculates and sends the on-duty command value on behalf of the failed current control semiconductor, thereby making it possible to achieve the fail-stop function or the fail-operative function of the current control device which is implemented with the current control semiconductor element and the microcontroller.

Next, the configuration of a solenoid control system using a current control device according to a second embodiment of the present invention will be described with reference to FIG. 5.

Figure 5:
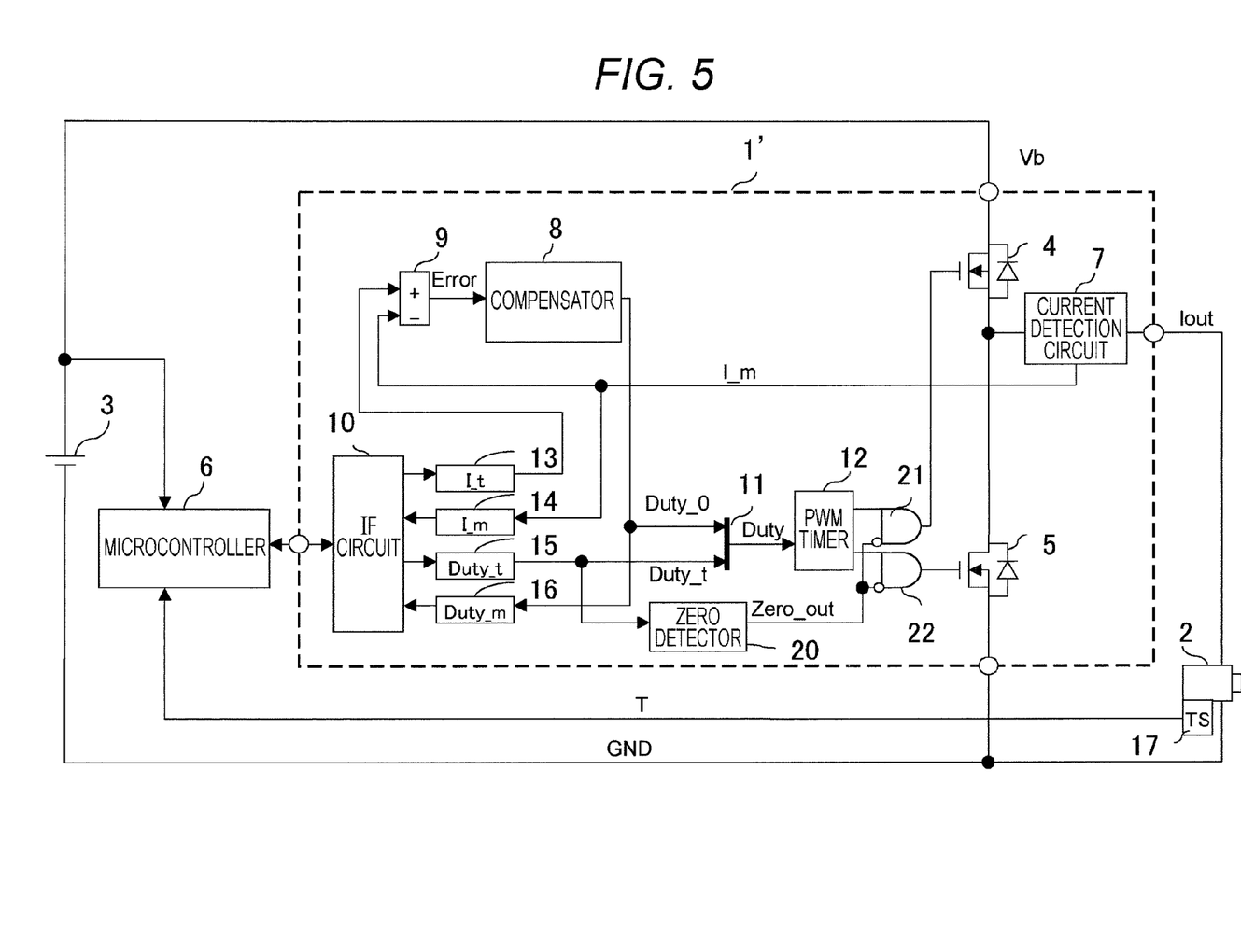
FIG. 5 is a block diagram illustrating the configuration of a solenoid control system using a current control device according to a second embodiment of the present invention.

FIG. 5 is a block diagram illustrating the configuration of the solenoid control system using the current control device according to the second embodiment of the present invention. The same reference sings as those in FIG. 1 refer to the same elements.

A current control semiconductor element 1' of the present embodiment is provided with a zero detector 20, an AND gate 21, and an AND gate 22 in addition to the configuration of the current control semiconductor element 1 of the first embodiment described with reference to FIG. 1.

The zero detector 20 outputs one as a Zero_out when the valid bit V of the on-duty command value register 15=1, and the on-duty command value Duty_t=0 are detected. When the Zero_out is one, the AND gate 21 and the AND gate 22 fix the output of the PWM timer 12 to zero.

The above configuration makes it possible to reliably execute a fail-safe function by writing zero to the on-duty command value register 15 to thereby turn off the high-side MOSFET 4 and the low-side MOSFET 5 even when failure of the selector 11 or the PWM timer 12 occurs.

As described above, since failure of the current control device is detected on the basis of the on-duty which is always calculated for controlling current and the current value output from the current detection circuit in the present embodiment, it is possible to achieve failure detection means of the current control device that is widely applicable and does not depend on the type of a sensor to be used.

Further, on behalf of the current control semiconductor element which does not have a failure diagnosis function, the microcontroller reads out the on-duty and the current value output from the current detection circuit from the current control semiconductor element to thereby perform failure diagnosis. Accordingly, it is possible to perform failure detection of the current control device which is implemented with the current control semiconductor element and the microcontroller.

Furthermore, when failure of the current control semiconductor occurs, the fail-stop function of the current control device can be reliably achieved.

Next, the configuration of a solenoid control system using a current control device according to a third embodiment of the present invention will be described with reference to FIG. 6

Figure 6:
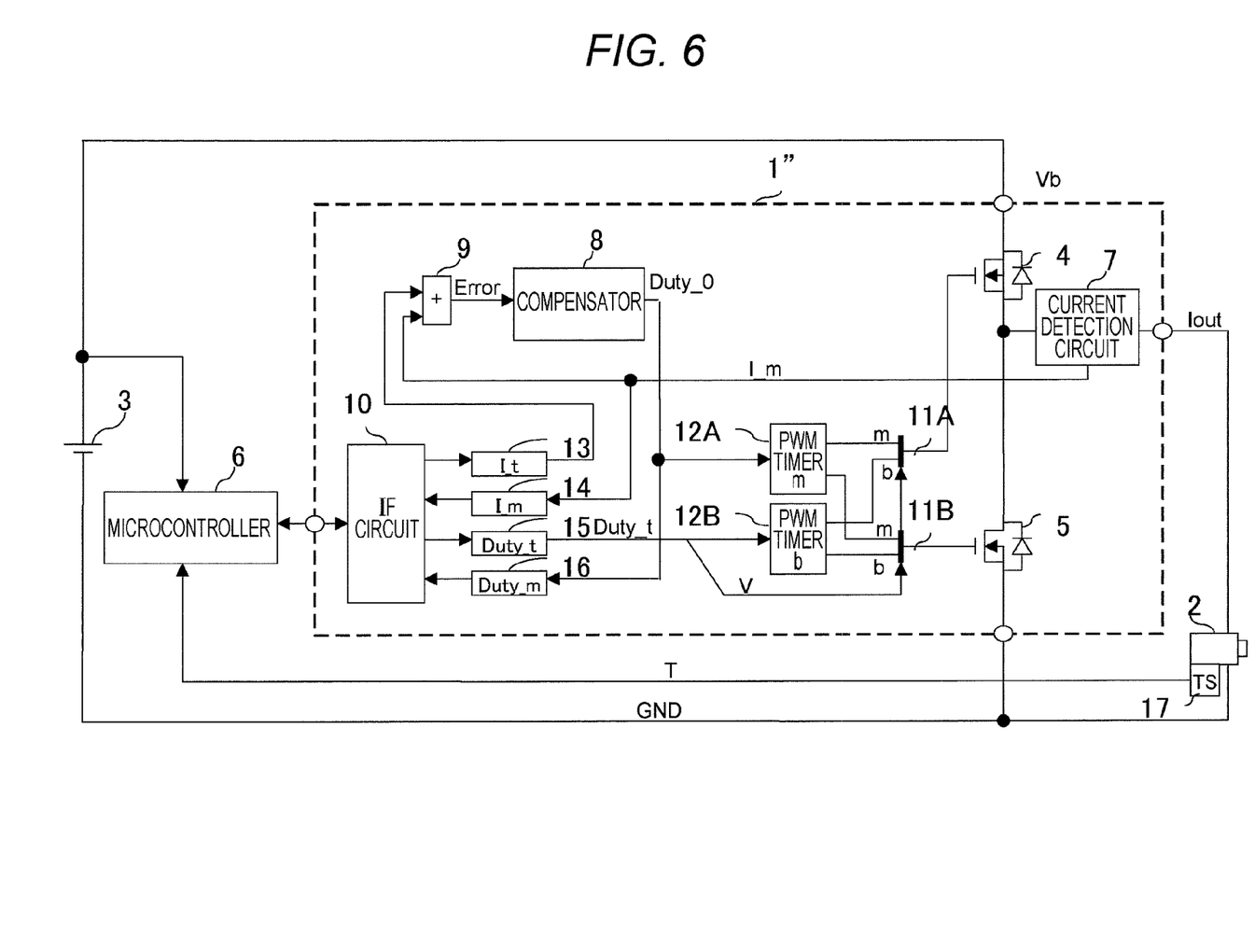
FIG. 6 is a block diagram illustrating the configuration of a solenoid control system using a current control device according to a third embodiment of the present invention.

FIG. 6 is a block diagram illustrating the configuration of the solenoid control system using the current control device according to the third embodiment of the present invention. The same reference sings as those in FIG. 1 refer to the same elements.

In a current control semiconductor element 1" of the present embodiment, the PWM timer 12 of the current control semiconductor element 1 of the first embodiment described with reference to FIG. 1 is duplicated into a PWM timer m 12A as a main and a PWM timer b 12B for backup. Further, the outputs of these two PWM timers 12A and 12B are selected by using a selector 11A and a selector 11B.

The selector 11A and the selector 11B select the output of the main PWM timer m 12A when the valid bit V of the on-duty command value register 15=0, and select the output of the backup PWM timer b 12B when the valid bit V=1.

The above configuration makes it possible to reliably execute a fail-safe function and a fail-operative function by writing a value to the on-duty command value register 15 to thereby output an on-duty pulse corresponding to the written value to the high-side MOSFET 4 and the low-side MOSFET 5 even when failure of the PWM timer m 12A occurs.

As described above, since failure of the current control device is detected on the basis of the on-duty which is always calculated for controlling current and the current value output from the current detection circuit in the present embodiment, it is possible to achieve failure detection means of the current control device that is widely applicable and does not depend on the type of a sensor to be used.

Further, on behalf of the current control semiconductor element which does not have a failure diagnosis function, the microcontroller reads out the on-duty and the current value output from the current detection circuit from the current control semiconductor element to thereby perform failure diagnosis. Accordingly, it is possible to perform failure detection of the current control device which is implemented with the current control semiconductor element and the microcontroller.

Furthermore, when failure of the current control semiconductor occurs, the fail-stop function or the fail-operative function of the current control device can be reliably achieved.

Next, the configuration and the operation of an automatic transmission control unit using the current control semiconductor element according to each of the embodiments of the present invention will be described with reference to FIG. 7.

Figure 7:
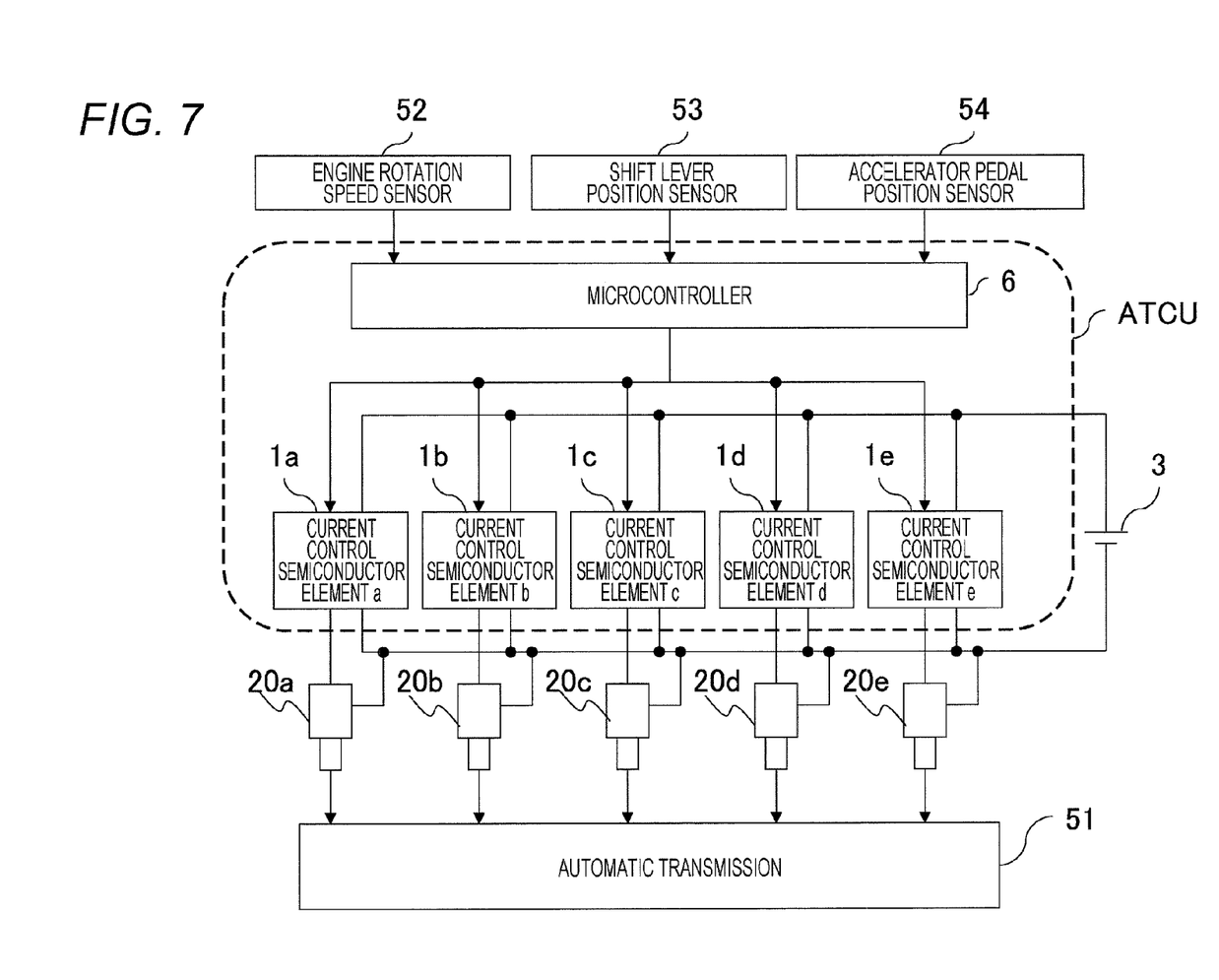
FIG. 7 is a block diagram illustrating the configuration of an automatic transmission control unit using the current control semiconductor element according to each of the embodiments of the present invention.

FIG. 7 is a block diagram illustrating the configuration of the automatic transmission control unit using the current control semiconductor element according to each of the embodiments of the present invention. In FIG. 7, the same reference sings as those in FIG. 1 refer to the same elements.

An automatic transmission control unit ATCU includes the microcontroller 6 shown in FIG. 1, and a plurality of current control semiconductor elements 1a to 1e which correspond to the current control semiconductor element 1.

The microcontroller 6 inputs sensor values from an engine rotation speed sensor 52, a shift lever position sensor 53, and an accelerator pedal position sensor 54, calculates an optimal transmission gear ratio from the input sensor values, calculates, for realizing the optimal transmission gear ratio, hydraulic pressure command values of a plurality of clutches (not shown) provided in a transmission 51 and current command values of solenoids 20a to 20e, the current command values corresponding to the respective hydraulic pressure command values, and outputs the calculated current command values Ia* to Ie* to the respective current control semiconductor elements 1a to 1e.

As described in the above respective embodiments, the microcontroller 6 is capable of improving reliability of the automatic transmission control unit ATCU by achieving reliable failure detection of the current control semiconductor elements 1a to 1e, the fail-safe function, and the fail-operative function.

In FIG. 7, the microcontroller 6 inputs the sensor values from three sensors including the engine rotation speed sensor 52, the shift lever position sensor 53, and the accelerator pedal position sensor 54. However, the number or the type of sensors from which sensor values are input may be changed according to a transmission control method. Further, although the microcontroller 6 inputs the sensor values directly from the sensors in FIG. 7, the sensor values may be input via another microcontroller or an integrated circuit (IC). Furthermore, although an example in which the automatic transmission 51 is provided with five clutches is shown in FIG. 7, the number of clutches and the number of solenoid current control devices corresponding to the number of clutches may be changed according to a transmission mechanism.

Figure 8:
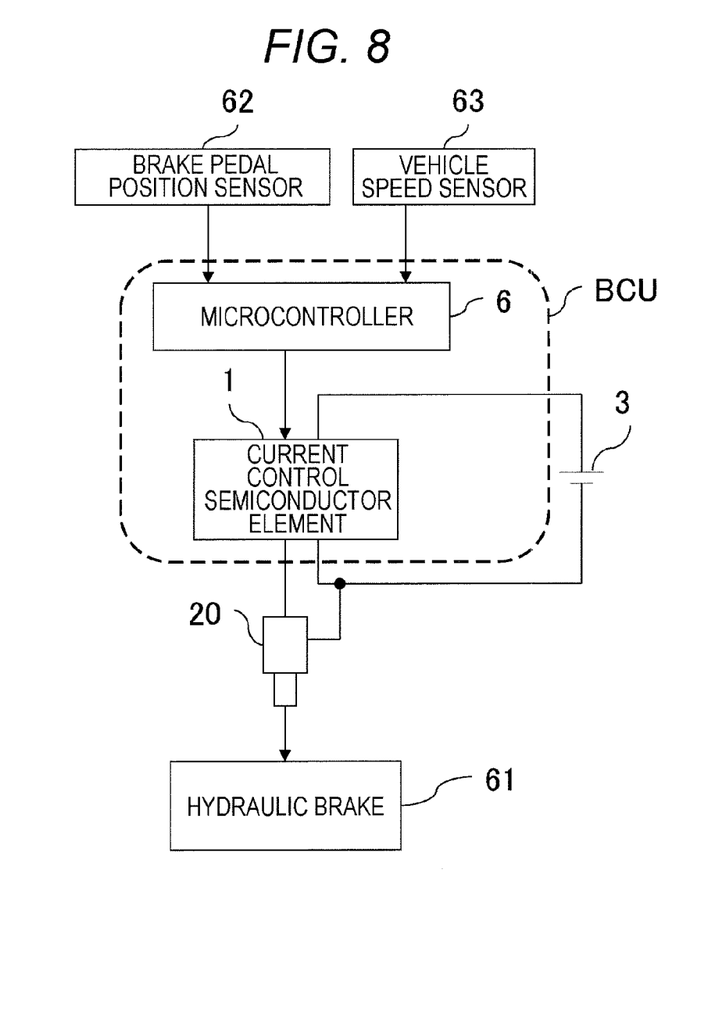
FIG. 8 is a block diagram illustrating the configuration of a brake control unit using the current control semiconductor element according to each of the embodiments of the present invention.

Next, the configuration and the operation of a brake control unit using the current control semiconductor element according to each of the embodiments of the present invention will be described with reference to FIG. 8. In FIG. 8, the same reference sings as those in FIG. 1 refer to the same elements.

FIG. 8 is a block diagram illustrating the configuration of the brake control unit using the current control semiconductor element according to each of the embodiments of the present invention. In FIG. 8, the same reference sings as those in FIG. 1 refer to the same elements.

A brake control unit BCU includes the microcontroller 6 and the current control semiconductor element 1 both of which are shown in FIG. 1.

The microcontroller 6 inputs sensor values from a brake pedal position sensor 63 and a vehicle speed sensor 64, calculates an optimal braking force from the input sensor values, calculates, for realizing the optimal braking force, a hydraulic pressure command value of a hydraulic brake 61 and a current command value of a solenoid 20, the current command value corresponding to the hydraulic pressure command value, and outputs the calculated current command value I* to the current control semiconductor element 1.

As described in the above respective embodiments, the microcontroller 6 is capable of improving reliability of the brake control unit BCU by achieving reliable failure detection of the current control semiconductor element 1, the fail-safe function, and the fail-operative function.

In FIG. 8, the microcontroller 6 inputs the sensor values from two sensors including the brake pedal position sensor 63 and the vehicle speed sensor 64. However, the number or the type of sensors from which sensor values are input may be changed according to a transmission control method. Further, although the microcontroller 6 inputs the sensor values directly from the sensors in FIG. 8, the sensor values may be input via another microcontroller or an IC.

Next, the configuration and the operation of a brushless motor control unit using the current control semiconductor element according to each of the embodiments of the present invention will be described with reference to FIG. 9.

Figure 9:
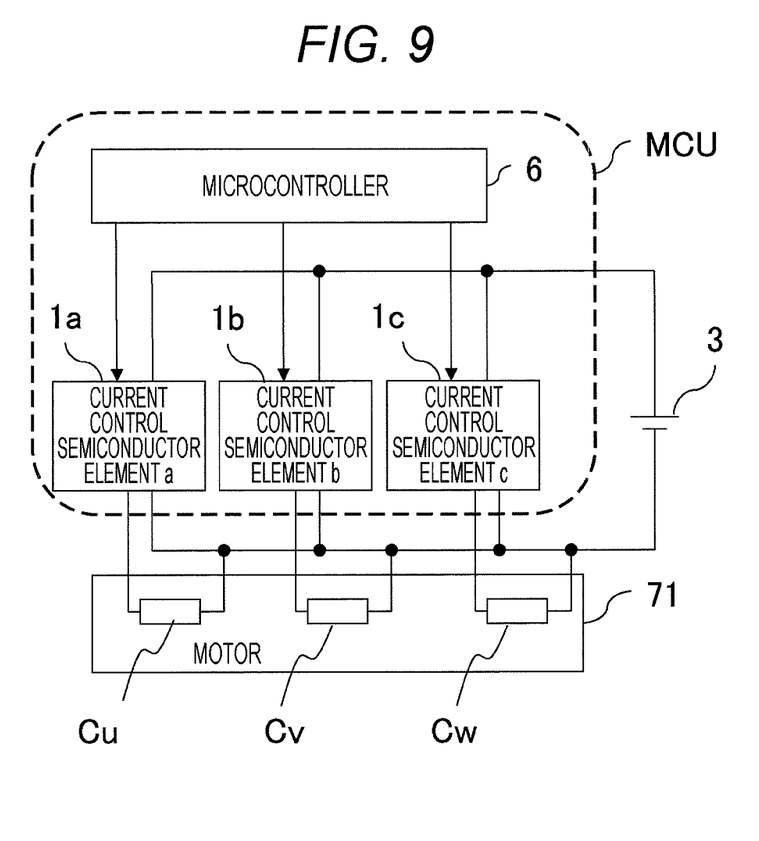
FIG. 9 is a block diagram illustrating the configuration of a brushless motor control unit using the current control semiconductor element according to each of the embodiments of the present invention.

FIG. 9 is a block diagram illustrating the configuration of the brushless motor control unit using the current control semiconductor element according to each of the embodiments of the present invention. In FIG. 8, the same reference sings as those in FIG. 1 refer to the same elements.

A brushless motor control unit MCU includes the microcontroller 6 and the current control semiconductor element 1 both of which are shown in FIG. 1.

The microcontroller 6 calculates a target rotation speed of a motor and a three-phase current command values with respect to three phase coils Cu, Cv and Cw of the motor 71 for realizing torque, and outputs the calculated current command values Iu*, Iv* and Iw* to respective current control semiconductor elements 1a to 1c.

As described in the above respective embodiments, the microcontroller 6 is capable of improving reliability of the brushless motor control unit MCU by achieving reliable failure detection of the current control semiconductor elements 1a to 1c, the fail-safe function, and the fail-operative function.

REFERENCE SIGNS LIST 1 current control semiconductor element
2 solenoid
3 battery
4 high-side MOSFET
5 low-side MOSFET
6 microcontroller
7 current detection circuit
8 compensator
9 difference calculator
10 IF circuit
11 selector
12 PWM timer
13 current command value register
14 current monitor value register
15 on-duty command value register
16 on-duty monitor value register

The invention claimed is:

1. A current control device comprising:
a current control semiconductor element including, on a same semiconductor chip,
a transistor for driving load,
a current detection circuit for detecting current of the load,
a compensator for calculating an on-duty of the transistor from a current command value and a current value output from the current detection circuit, and
a PWM timer for generating a pulse turning on the transistor on the basis of the on-duty; and
a microcontroller for sending the current command value to the current control semiconductor element,
wherein the microcontroller receives a current value output from the current detection circuit and an on-duty output from the compensator from the current control semiconductor element and detects failure of the current control semiconductor element on the basis of the current value and the on-duty both received from the current control semiconductor element, detects failure of the current control semiconductor element when the current value received from the current control semiconductor element does not agree with a current command value or when the on-duty received from the current control semiconductor element does not agree with an expected value of the on-duty, and sends zero as an on-duty command value to the current control semiconductor element after detecting failure of the current control semiconductor element, and
the current control semiconductor element performs off control of the transistor in accordance with the on-duty command value received from the microcontroller and includes a selector for selecting either an on-duty output from the compensator or the on-duty command value received from the microcontroller, and the selector selects the on-duty command value received from the microcontroller on the basis of information on a valid bit output from the microcontroller and performs off control of the transistor in accordance with the on-duty command value.

2. The current control device according to claim 1, wherein the current control semiconductor element includes a zero detector for detecting that the on-duty command value received from the microcontroller is zero, and the zero detector causes output of the PWM timer to become zero to perform off control of the transistor.

3. A current control device comprising:
a current control semiconductor element including, on a same semiconductor chip,
a transistor for driving load,
a current detection circuit for detecting current of the load,
a compensator for calculating an on-duty of the transistor from a current command value and a current value output from the current detection circuit, and
a PWM timer for generating a pulse turning on the transistor on the basis of the on-duty; and
a microcontroller for sending the current command value to the current control semiconductor element,
wherein the microcontroller receives a current value output from the current detection circuit and an on-duty output from the compensator from the current control semiconductor element and detects failure of the current control semiconductor element on the basis of the current value and the on-duty both received from the current control semiconductor element, detects failure of the current control semiconductor element when the current value received from the current control semiconductor element does not agree with a current command value or when the on-duty received from the current control semiconductor element does not agree with an expected value of the on-duty, and sends an on-duty command value to the current control semiconductor element after detecting failure of the current control semiconductor element, and the current control semiconductor element performs on and off control of the transistor in accordance with the on-duty command value received from the microcontroller.

4. The current control device according to claim 3, wherein the current control semiconductor element includes a selector for selecting either an on-duty output from the compensator or the on-duty command value received from the microcontroller, and the selector selects the on-duty command value received from the microcontroller on the basis of information on a valid bit output from the microcontroller and performs on and off control of the transistor in accordance with the on-duty command value.

5. The current control device according to claim 3, wherein the current control semiconductor element includes, in addition to the PWM timer for generating a pulse turning on the transistor on the basis of an on-duty output from the compensator, a second PWM timer for generating a pulse turning on the transistor on the basis of the on-duty command value received from the microcontroller, and a selector for selecting either a pulse output from the PWM timer or a pulse output from the second PWM timer, and the selector selects the pulse output from the second PWM timer on the basis of information on a valid bit output from the microcontroller and performs on and off control of the transistor in accordance with the pulse.

* * * * *